United States Patent [19]

Morimoto

[11] Patent Number: 4,862,457
[45] Date of Patent: Aug. 29, 1989

[54] RADIO TRANSMISSION SYSTEM HAVING SIMPLIFIED ERROR CODING CIRCUITRY AND FAST CHANNEL SWITCHING

[75] Inventor: Hideaki Morimoto, Tokyo, Japan

[73] Assignee: NEC Corporation, Tokyo, Japan

[21] Appl. No.: 32,645

[22] Filed: Mar. 31, 1987

[30] Foreign Application Priority Data

Mar. 31, 1986 [JP]  Japan .................................. 61-74912
Nov. 19, 1986 [JP]  Japan ................................ 61-277157

[51] Int. Cl.$^4$ ............................................ G06F 11/20
[52] U.S. Cl. ........................................ 371/8; 371/37; 370/109
[58] Field of Search .................. 371/8, 37, 35, 40, 43; 370/16, 109; 455/8, 17; 340/825.01

[56] References Cited

U.S. PATENT DOCUMENTS

| | | | |
|---|---|---|---|
| 3,988,677 | 10/1976 | Fletcher | 371/37 X |
| 4,238,852 | 12/1980 | Iga | 371/40 |
| 4,365,248 | 12/1982 | Bargeton | 371/8 X |
| 4,660,196 | 4/1987 | Gray | 370/109 |
| 4,686,675 | 8/1987 | Morimoto | 371/8 |

*Primary Examiner*—Jerry Smith
*Assistant Examiner*—Robert W. Beausoliel

[57] ABSTRACT

A digital radio transmission system comprises a transmit digital processing unit that compresses the time scale of a prescribed number of consecutive data bits for leaving a time interval between adjacent time-compressed data bits, generates an additional bit and inserts it into a portion of the time interval immediately following the time-compressed data bits to form composite bits. An error correcting encoder performs computations on the composite bits according to an encoding theorem and inserts an error correcting code into the remainder of the time interval, forming a block code. An error correcting decoder performs computations on the block code according to a decoding theorem for correcting error in the composite bits. A receive digital processing unit separates the additional bit and the time-compressed data bits of the error-corrected composite bits and expands the time scale of the separated time-compressed data bits. To ensure fast channel switching the error correcting decoder is synchronized with framing bits to minimize the effect of a timing disruption which occurs briefly if the transmit DPU of a faulty regular channel is switched to the error correcting encoder of a standby channel.

4 Claims, 5 Drawing Sheets

RADIO TRANSMISSION SYSTEM HAVING SIMPLIFIED ERROR CODING CIRCUITRY AND FAST CHANNEL SWITCHING

BACKGROUND OF THE INVENTION

The present invention relates to radio transmission systems, and more particularly to a digital radio transmission system that simplifies circuitry for forward error correcting encoders and reduces the period of switching between regular and standby channels in the event of a fault due to fading.

With advancing technologies in digital radio transmission, multilevel quadrature amplitude modulation techniques such as 16 QAM and 64 QAM are increasingly incorporated into microwave digital radio transmission links which interconnect digital switching nodes. To improve the bit error rate of the radio transmission facilities forward error correction techniques are employed. Specifically, the conventional digital microwave radio transmission system comprises a bipolar-to-unipolar converter for converting the bipolar time-division digital signals transmitted over coaxial cables from a switching node to unipolar TDM digital signals and a transmit digital processing unit which performs time expansion on a block of a prescribed number of the incoming data bits and inserts additional bits for channel supervision and switching to form a series of composite bits for transmission to a receiving station where processes the signal in a manner inverse to that of the transmitting station. To effect forward error correction in the transmitting station, the composite bits are fed to a forward error correcting encoder where the composite bits are again time-compressed to leave a time slot and error computations are performed on the time-compressed composite bits according to an error encoding theorem to generate an error correcting code which is inserted to the time slot to form a block code. The error decoding process at the receiving station is a process inverse to that the error encoding process and two stages of time expansion are required for expanding the time scale of the composite bits following the execution of an error decoding process and for expanding the time scale of the compressed data bits after extraction of the additional bits.

Since the time compression process requires a memory, a phase-locked loop and a counter for matching different data rates, they must be duplicated for insertion of control bits and insertion of error correcting codes. Likewise, the time expansion process requires a similar arrangement, and therefore phase-locked loops and counters must be duplicated for the error correcting decoder and receive digital processing unit, although such duplications serve to minimize the timing disruption in the sequence of computations of the forward error correcting encoder if channel switching is effected at a point between the output of a regular-channel transmit digital processing unit and the input of a standby-channel forward error correcting encoder in the event of a fault in the regular channel.

SUMMARY OF THE INVENTION

It is therefore an object of the present invention to provide a digital radio transmission system having simplified error correcting circuitry.

The digital radio transmission system of the present invention comprises a transmit digital processing unit that compresses the time scale of a prescribed number of consecutive data bits for leaving a time interval of a predetermined number of bits between adjacent time-compressed data bits and generates an additional bit and inserts it into a portion of the time interval immediately following the time-compressed data bits to form composite bits. An error correcting encoder performs computations on the composite bits according to an error encoding theorem and inserts an error correcting code derived from the computations into the remainder of the time interval, thereby forming a block code with the composite bits and the error correcting code. An error correcting decoder performs computations on the block code according to an error decoding theorem for correcting error in the composite bits. A receive digital processing unit is responsive to the output of the error correcting decoder to separate the additional bit and the time-compressed data bits of the error-corrected composite bits from each other and expand the time scale of the separated time-compressed data bits.

Because of the single operation of time compression and expansion of the time scale of a digital signal on each radio channel of the system, error encoding and decoding circuitry can be significantly simplified.

In the radio transmission system, a standby channel is usually provided for a plurality of regular channels. If a bit error rate of a regular channel exceeds a predetermined level due to fading, the regular channel is treated as faulty and the output of the transmit digital processing unit is switched into circuit with the forward error correcting encoder of the standby channel and this switching occurs at the output of a regular-channel transmit digital processing unit to the input of a standby-channel forward error correcting encoder. Although the single time compression operation simplifies error encoding circuitry, it is highly likely that a brief disruption occurs in the sequence of computations in the standby-channel forward error correcting encoder, causing what is known as "word-sync misalignment". If this word-sync misalignment is treated at the receiving station in the same manner as in prior art standby-channel error correcting decoders of the type which derives its timing from the incoming data bit stream, the decoder will take a very long time to recover proper timing (word synchronization) for error decoding computations. As a result, a decoding sequence disruption will persist for a substantial period of time even though proper timing has been reestablished at the transmitting end and channel switching at a receiving station must be delayed following the occurrence of a fault in a regular channel.

The present invention eliminates this problem by causing a frame synchronizer at a receiving station to derive a timing signal and causing a forward error correcting decoding sequence to be synchronized with the derived timing signal. Since frame acquisition time is much shorter than the self-derived word acquisition time for error encoding and decoding operations, frame-derived word synchronization can be reestablished in a short period of time at the receiving station.

Specifically, the present invention provides a digital radio transmission system which comprises a transmit digital processing unit which compresses the time scale of a prescribed number of consecutive data bits for leaving a time interval of a predetermined length between adjacent time-compressed data bits and generates a control bit and a framing bit and inserting them into a portion of the time interval to form composite bits. A regular-channel error correcting encoder is provided for performing computations on the composite bits according to an error encoding theorem and inserting an error correcting code derived from the computations into the remainder of the time interval, thereby forming a first block code with the composite bits and the error correcting code and transmitting the first block code over a regular transmission channel. A standby-channel error correcting encoder performs computations on the composite bits according to the error encoding theorem and inserts an error correcting code derived from the computations into the remainder of the time interval, thereby forming a second block code with the last-mentioned composite bits and the last-mentioned error correcting code and transmits the second block code over a standby transmission channel. A first channel-switching circuit normally connects the transmit digital processing unit to the input of the regular-channel error correcting encoder and switches the transmit digital processing unit to the input of the standby-channel error correcting encoder in the event of a fault in the regular transmission channel. A regular-channel frame synchronizer is provided for detecting the framing bit in the transmitted first block code to establish frame synchronization and generating a first timing signal in response to the detection of the framing bit. A regular-channel error correcting decoder performs computations on the transmitted first block code in response to the first timing signal according to an error decoding theorem for correcting error in the composite bits of the first block code. A standby-channel frame synchronizer detects the framing bit in the transmitted second block code to establish frame synchronization and generates a second timing signal in response to the detection of the last-mentioned framing bit. A standby-channel error correcting decoder performs computations on the transmitted second block code in response to the second timing signal according to the error decoding theorem for correcting error in the composite bits of the second block code. A receive digital processing unit detects the control bit and the time-compressed data bits from the error corrected composite bits of one of the first and second block codes and expanding the time scale of the detected time-compressed data bits. A second channel-switching circuit normally connects the receive digital processing unit to the output of the regular-channel error correcting decoder and switches the receive digital processing unit to the output of the standby-channel error correcting decoder in the event of the fault.

BRIEF DESCRIPTION OF THE DRAWINGS

The present invention will be described in further detail with reference to the accompanying drawings, in which.

DETAILED DESCRIPTION
STRUCTURES AND FUNCTIONS

Figure 1:
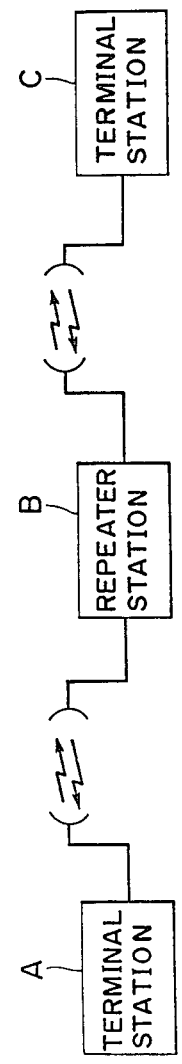
FIG. 1 is a schematic illustration of a digital radio transmission system.

As schematically illustrated in FIG. 1, the digital radio transmission system of the present invention extends between microwave terminal stations A and C by way of a repeater station B. Remote subscriber terminals may be directly connected to terminal stations A and C, but usually telecommunication switching systems are interfaced to these radio stations through time-division multiplexers for transmission of TDM digital signals and through time-division demultiplexers for reception of such TDM signals.

Figure 2:
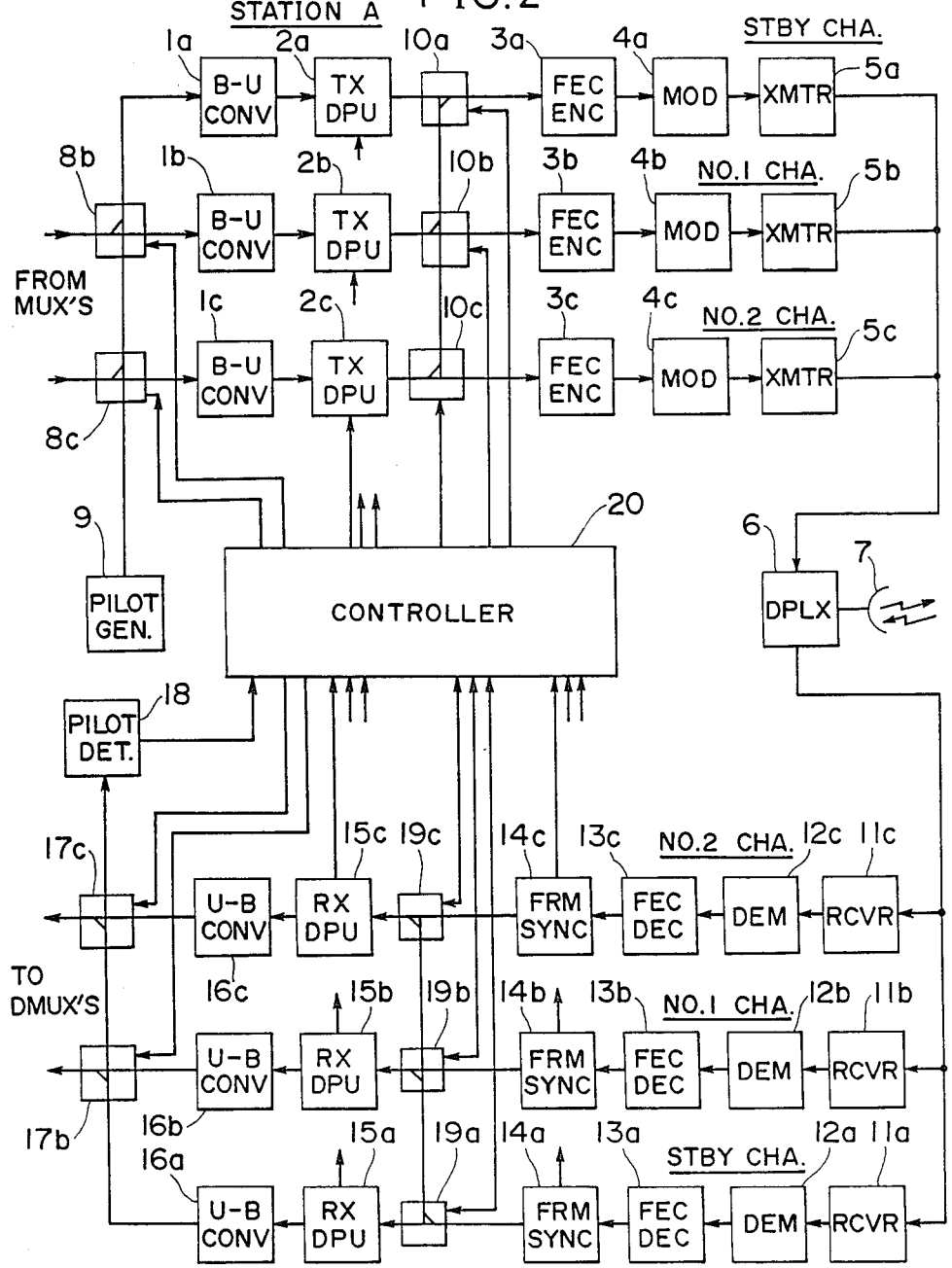
FIG. 2 is a block diagram of the terminal station A of FIG. 1.
Figure 3:
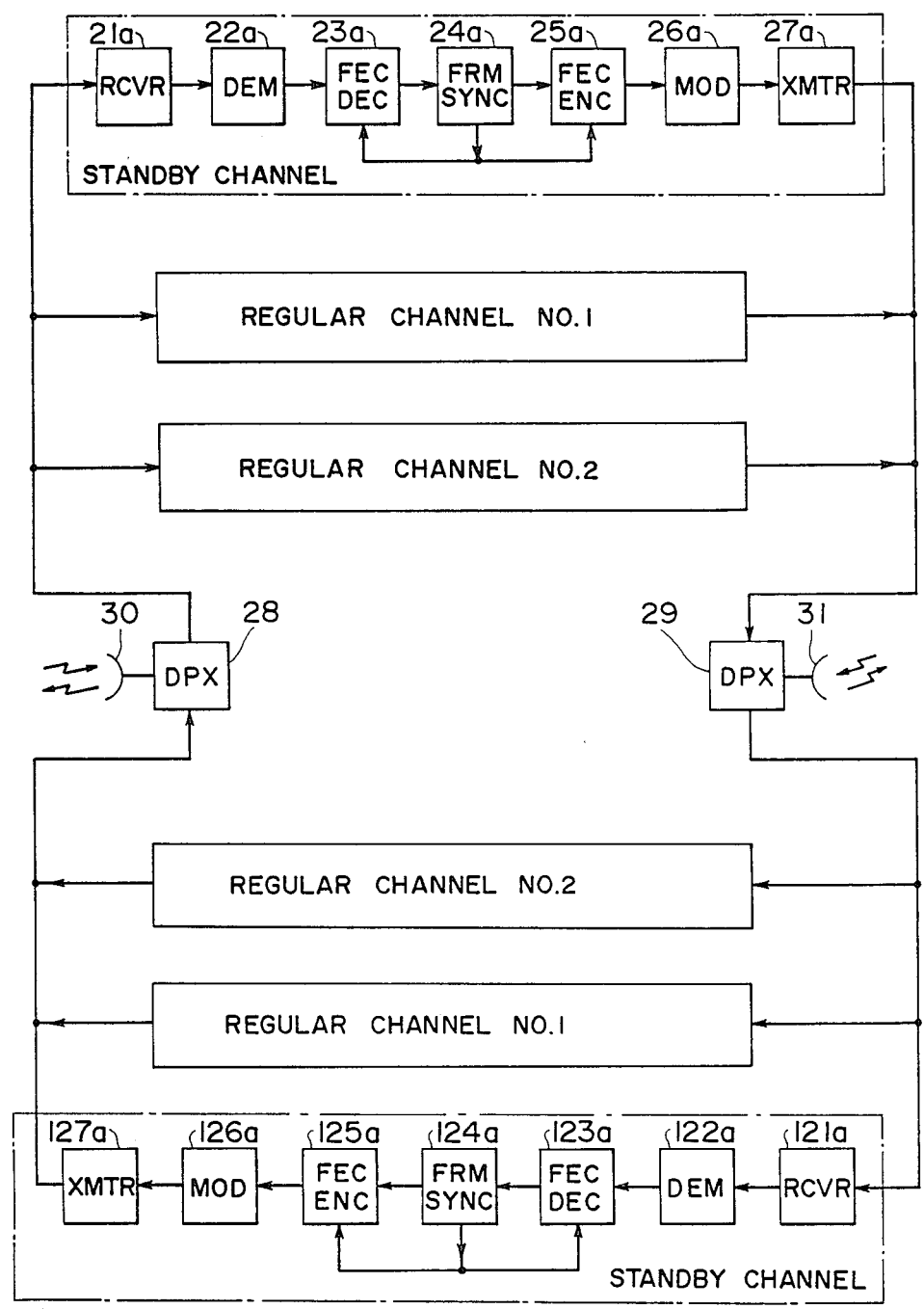
FIG. 3 is a block diagram of the repeater station of FIG. 1.
Figure 4:
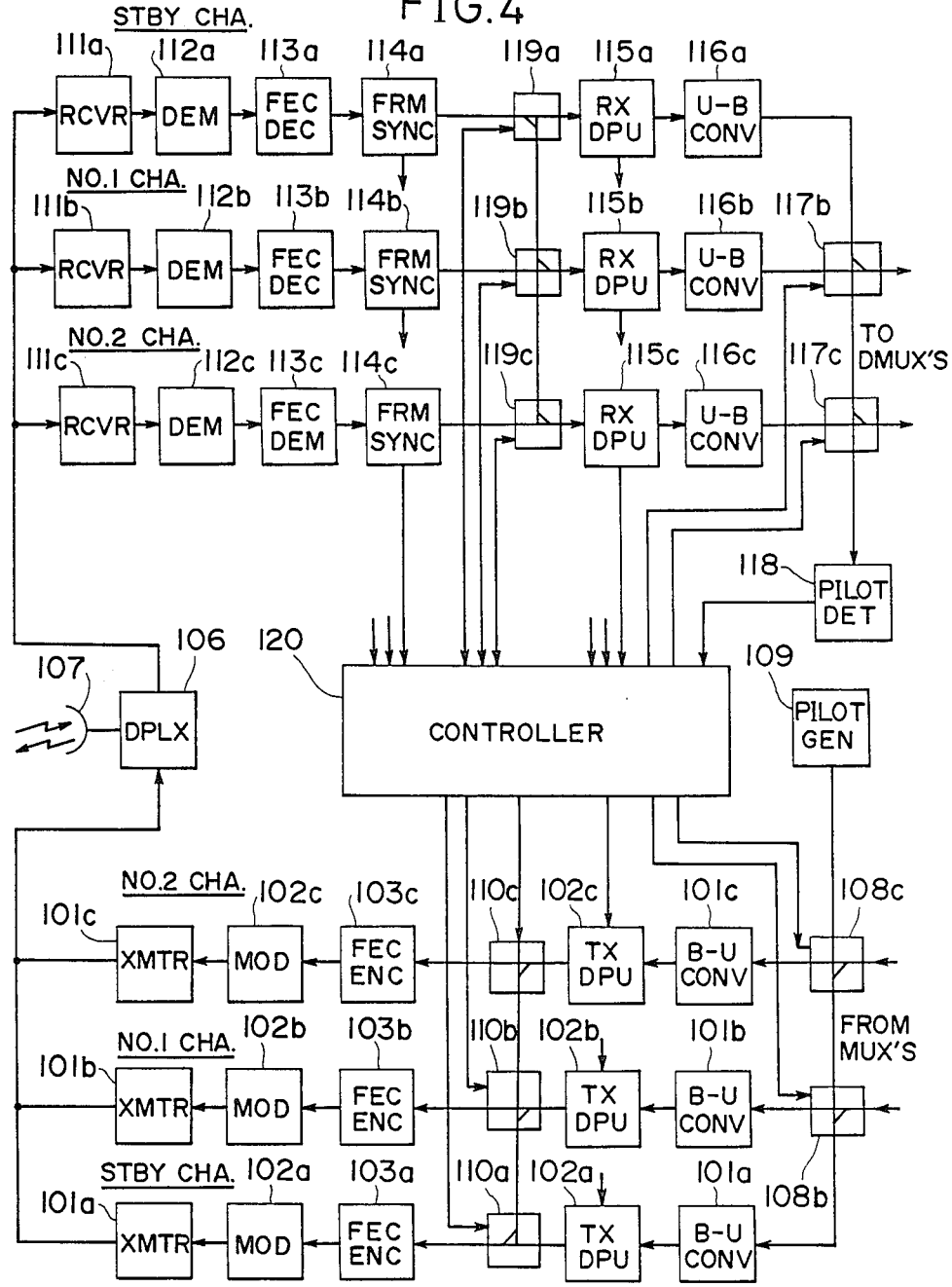
FIG. 4 is a block diagram of the terminal station C of FIG. 1.

As shown in FIGS. 2 to 4, each radio station includes a set of N regular channels and a standby channel for each direction of transmission. For purposes of disclosure, only two regular channels No. 1 and No. 2 are illustrated for each direction. In FIG. 2, the terminal station A comprises Nos. 1 and 2 transmit regular channels and a transmit standby channel and Nos. 1 and 2 receive regular channels and a receive standby channel. All control functions are centralized in a controller 20.

Each of the transmit channels is identically composed of a bipolar-to-unipolar converter 1 which converts the signal received through an associated time-division multiplexer, not shown, in bipolar form over a coaxial cable to unipolar form for radio transmission. In each transmit channel, a transmit digital processing unit (DPU) 2 is connected to the output of bipolar-to-unipolar converter 1 for providing digital processing of the unipolar signal in a manner as will be described later. Briefly described, the transmit DPU 2 provides time compression on a prescribed number of bits of the incoming unipolar data stream to allow for insertion of additional bits including a parity bit and a framing bit to provide the first level of framing and for insertion of a time slot with a string of all binary zero's. The time-compressed data bits and the additional bits form composite bits.

In each transmit channel, a forward error correcting (FEC) encoder 3 is connected to the output of transmit DPU 2 of the same channel to insert an error-correcting code to the time slot so that signals detected as being in error are automatically corrected at the receiving stations before delivery to remote terminals. A digital modulator 4 such as 16-QAM modulator and a transmitter 5 are cascaded to the output FEC encoder 3 for transmitting a modulated digital signal on a particular carrier frequency. The outputs of transmitters 5 are connected together to an input terminal of a duplexer 6 and thence to a microwave antenna 7.

The Nos. 1 and 2 regular transmit channels include electromechanical switches 8. Under normal conditions, bipolar digital signals from the multiplexers are coupled to the bipolar-to-unipolar converters 1 of the associated regular channels and a test signal from a pilot generator 9 is coupled to the bipolar-to-unipolar converter 1a of the standby transmit channel. The electromechanical switches 8 are operated when a fault condition occurs in the B-U converters 1 and transmit DPUs 2 by coupling the output of the associated multiplexer to the standby transmit channel and decoupling the test signal from the standby channel. Switches 8 are also operated when a fault condition occurs in unipolar-to-bipolar (U-B) converters and receive DPUs of the receiving station C. Switching control signals for operating the electromechanical switches 8 are supplied from the controller 20 as it receives an alarm signal from a receive DPU of the channel associated with the transmit channel in a manner as will be described. Further included are solid-state channel switching circuits 10 which are respectively connected between the transmit digital processing units 2 and FEC encoders 3a of the standby channel and the Nos. 1 and 2 regular channels. Under normal conditions, the outputs of transmit DPUs 2a, 2b and 2c are connected respectively to the FEC encoders 3a, 3b and 3c. As will be described later, if a faulty condition occurs in one of the regular transmit channels due to fading or the like, the controller 20 is notified of this fact by a control signal inserted in a predetermined time slot of the TDM superframe through a receive channel which forms a pair of "go" and "return" paths with the faulty transmit channel to cause the switching circuit 10a of the standby transmit channel to connect the output of transmit DPU 2 of the faulty channel into circuit with the input of FEC encoder 3a of the standby channel. As a result, the output signal of the transmit DPU 2 of the faulty channel is transmitted simultaneously over the standby and faulty channels until bit synchronization is reestablished in the activated standby channel at the receiving station C.

Each of the receive channels comprises a receiver 11 tuned to a particular frequency band, a demodulator 12 and a forward error correcting decoder 13 which are cascaded to the output of duplexer 6. The FEC decoder 13 performs error correcting computations on the composite bits of each block code recovered by demodulator 12 using the error correcting code contained therein according to a known error decoding theorem and supplies an error-corrected signal without expanding the error corrected composite bits to a frame synchronizer 14 which detects framing bits from the output of FEC decoder 13 to allow frame timing of the channel to be synchronized with the data stream and to supply a signal indicative of this frame timing to the controller 20. The synchronized data stream is normally coupled to the receive DPU 15 of the same channel. Each receive DPU 15 removes the overhead bits from the input signal so that it contains only data bits and provides expansion of the time scale of data bits to recover the original signal. Each receive DPU 15 includes a fault detection circuit that monitors the bit error rate of the associated channel and an alarm signal transmitted in a superframe time slot from terminal station C and communicates this fact to the controller 20, which determines which one of the transmit and receive channels is faulty. The unipolar output of each receive DPU 15 is converted to bipolar format by an associated unipolar-to-bipolar converter 16.

The receive channels include electromechanical switches 17 connected respectively to the outputs of Nos. 1 and 2 regular receive channels. Under normal conditions, the outputs of the regular receive channels are coupled to the associated time-division demultiplexers, not shown, while the output of the standby receive channel is coupled to a pilot detector 18 which monitors the test signal transmitted from the pilot generator of terminal station C. If a fault condition occurs in the standby receive channel, pilot detector 18 communicates this fact to the controller 20 to prevent channel switching operation. These electromechanical switches 17 are operated when a fault is detected in the receive DPUs and U-B converters of the regular receive channels by coupling the output of U-B converter 16a of the standby channel to the demultiplexer that has been associated with the faulty receive channel.

The outputs of frame synchronizers 14 are normally connected through solid-state channel switching circuits 19 to the receive DPU's 15 of the same channels. Receive DPUs 15 monitor the bit error rate of the associated receive channels. If a faulty condition occurs in a regular receive channel, the receive DPU 15 of this channel communicates this fact to the controller 20 which in turn sends a switching control signal through the transmit DPU 2 associated with the faulty receive channel to the terminal station C. This switching control signal is applied to the controller of the terminal station C to cause channel switching to occur at the transmit end of this faulty receive channel. When this occurs, the frame synchronizer 14a of the standby channel attempts to detect a framing bit to establish synchronization. Upon detection of a framing bit, the standby frame synchronizer 14a notifies this fact to the controller 20 to direct the switching circuit 19a of the standby channel to establish bit synchronization. Upon establishment of bit synchronism, the standby channel switching circuit 19a communicates this fact to the controller 20 to operate the faulty channel switching circuit 19 to disconnect the output of the faulty channel frame synchronizer 14 out of circuit with the input of receive DPU 15 which has been associated with it.

Figure 5:
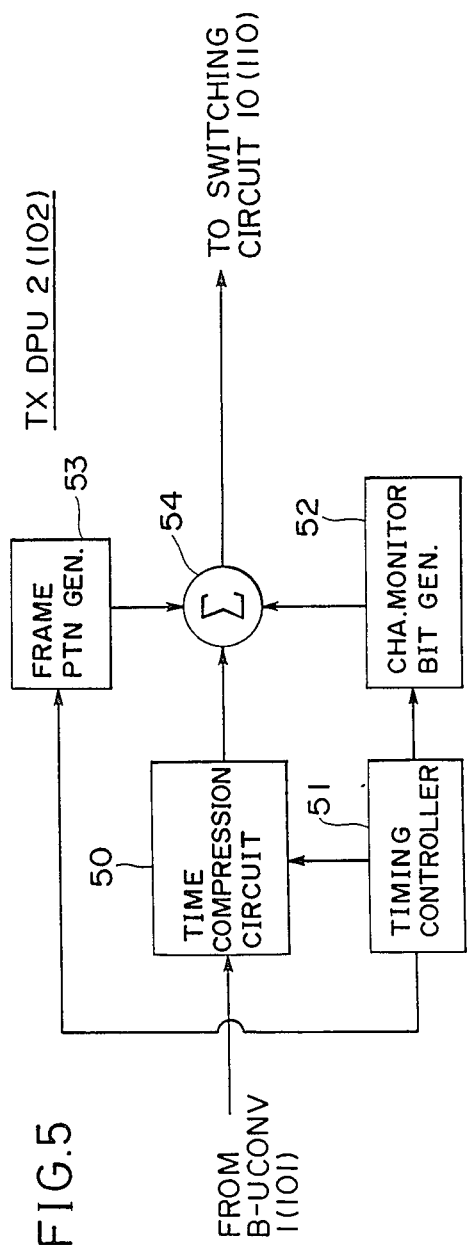
FIG. 5 is a block diagram of the transmit digital processing units of FIGS. 1 and 4.
Figure 6:
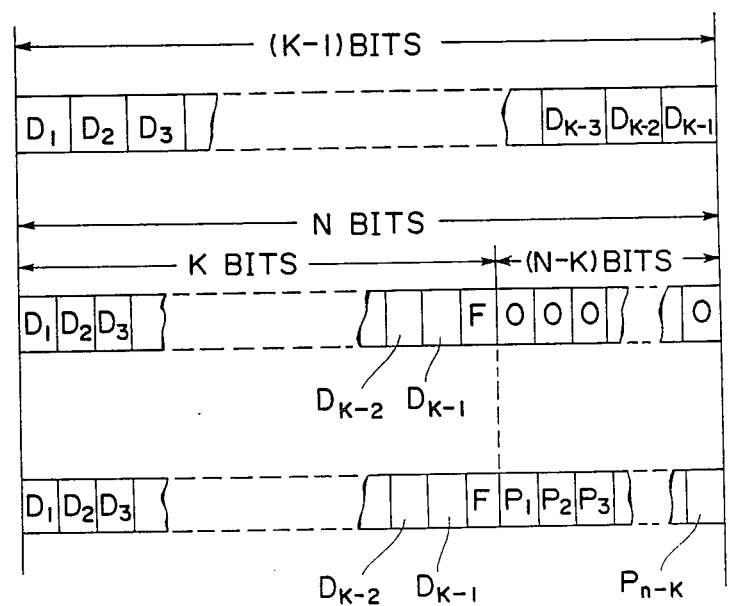
FIG. 6 is an illustration of data formats employed in the forward error correcting encoders of FIG. 1 and 4.

Before proceeding with the description of repeater station B, it is appropriate to describe the detail of each of the transmit digital processing units of terminal station A with reference to FIG. 5. Transmit DPU comprises a time-compression circuit 50 which includes a memory and a phase comparator that detects a phase difference between an input clock signal from a timing controller 51 and a clock input supplied through a gate from a voltage controlled oscillator whose frequency is controlled by the phase difference. Input data stream from the associated B-U converter 1 is written into the memory at the clock timing of the timing controller 51 and read out of it at the gated clock timing of the VCO. A counter circuit is included in the time compression circuit to count the oscillations of the VCO to disable the gate to compress the time scale of the input data stream. Assume that the input data stream is represented by a series of consecutive $(K-1)$ data bits designated $D_1$ through $D_{k-1}$ as illustrated in FIG. 6. These data bits are input to the time compression circuit 50 at the transmission rate and delivered therefrom at a compression rate $(K-1)/(N-K+1)$ to allow for insertion of a control field F immediately following the data bit $D_{k-1}$ to form a composite word of K bits and a time slot of $(N-K)$ bits. The control field F is occupied with a parity bit generated by a channel monitor bit generator 52 and with a framing bit generated by a frame pattern generator 53. The insertion of these additional control bits are effected by a multiplexer 54 under control of timing controller 51 to generate a series of N unipolar bits comprising $(K-1)$ data bits, one control bit and a time slot which is a string of $(N-K)$ binary zero's. The output of multiplexer 54 is supplied through the switching circuit 10 to the associated FEC encoder 3. FEC encoder 3 treats the K-bit of combined data and control bits as information bits by performing computations according to the well known error coding theorem, generates error correcting bits $P_1$ through $P_{n-k}$ and inserts them into the $(N-K)$-bit time slot of the incoming data stream. The output of FEC encoder 3 is therefore a series of N-bit block codes with a code-rate efficiency of K/N. Because of the single time compressing operation by the transmit data processing units 10, the FEC encoders 3 are not required to effect time compression which is provided in the prior art using phase locked loops and counters. Thus, FEC encoders 3 can be simplified and rendered economical.

Referring to FIG. 3, the repeater station B comprises antennas 30 and 31 respectively pointed towards the antennas of terminal stations A and C, three A-to-C channels for relaying signals from station A to station C and three C-to-A channels for relaying signals from station C to station A. A-to-C channels comprise regular channels Nos. 1 and 2 and a standby channel. Each of these A-to-C channels are identically composed of a receiver 21a, a demodulator 22a, a forward error correcting decoder 23a, a frame synchronizer 24a, a forward error correcting encoder 25a, a modulator 26a and a transmitter 27a, all of which are cascaded from the output terminal of a duplexer 28 coupled to antenna 30 to the input terminal of a duplexer 29 coupled to antenna 31. The FEC decoder 23a performs error correcting computations on the time-compressed codeword according to a well known error decoding theorem to correct bits in error and supplies the error-corrected data stream to frame synchronizer 24a. Frame synchronizer 24a detects a frame sync, establish frame alignment with the data bit stream and supplies a frame timing pulse to FEC decoder 23a and FEC encoder 25a to permit them to quickly reestablish word synchronization with the data stream when channel switching takes place in the terminal station A. In like manner, each of the C-to-A channels are identically composed of a receiver 121a, a demodulator 122a, a forward error correcting decoder 123a, a frame synchronizer 124a, a forward error correcting encoder 125a, a modulator 126a and a transmitter 127a, all of which are cascaded from the output terminal of duplexer 29 to the input terminal of duplexer 28. Frame synchronizer 124a detects a framing bit and supplies a frame timing pulse to FEC decoder 123a and FEC encoder 125a to permit them to quickly reestablish word synchronization when channel switching takes place in the terminal station C.

Terminal station C is identically constructed to terminal station A as shown in FIG. 4. Receive channels are tuned respectively to the carrier frequencies of the transmit channels of terminal station A and transmit channels are associated respectively to the receive channels of terminal station A. Parts corresponding to those of FIG. 2 are marked with numerals "1" in the hundredth unit plus corresponding numerals to those in FIG. 2.

OPERATION

During normal operation of the radio transmission system, TDM digital signals are transmitted in opposite directions over regular channels between terminal stations A and C. Assume that a bit error rate of the No. 1 transmit channel between terminal station A and repeater station B exceeds a predetermined value due to fading. Recognizing this as a faulty condition, the receive DPU 115b at terminal station C communicates this fact to the station C controller 120. Controller 120 proceeds to check the output of the pilot detector 118 to see if there is no faulty condition in the standby channel from station A to station C. If there is no faulty condition in this A-to-C standby channel, controller 120 supplies a switching control signal to the transmit DPU 102b.

In response to the switching control signal the transmit DPU 102b inserts a switching control word to a particular superframe control field of the TDM signal transmitted over the No. 1 C-to-A regular channel that forms a pair with the faulty No. 1 A-to-C channel. The receive DPU 15b at terminal station A monitors this superframe control field and notifies the controller 20 of the occurrence of a faulty condition in the No. 1 transmit channel of terminal station A and applies switching signals to the channel switching circuits 10a and 10b to simultaneously bring the output of transmit DPU 2b into circuit with the inputs of FEC encoders 3a and 3b, and so the same TDM signal is transmitted simultaneously over the standby channel and the faulty No. 1 channel to terminal station C.

This channel switching will disrupt the error coding sequence of the standby-channel FEC encoder 3a and the word synchronizations of the repeater station FEC decoder 23a and FEC encoder 25a of repeater station B are lost and hence the loss of word synchronization in the standby-channel forward error correcting decoder 113a. If the data stream is treated by the repeater station in the same manner as in the prior art in which the FEC decoders and FEC encoders derive their timing information from their input data bit streams, they would take a long acquisition time to establish word synchronization. Thus, a substantial period of time would elapse after a faulty condition is detected in a regular channel before switching can take place at the terminal station C.

The present invention avoids this problem by the derivation of a timing signal from the repeater station frame synchronizer 24a for application to the FEC decoder 23a and FEC encoder 25a. Since the bit error rate of the data stream transmitted over the standby channel can be considered negligibly small, frame synchronizer 24a is likely to detect a framing bit in the received data stream in a short period time following the channel switching operation even though its frame synchronization is lost due to the loss of word synchronization in the decoder 23a and reestablishes frame synchronization in a much shorter period of time than would otherwise be required for the standby channel to reestablish word synchronization. With frame synchronization being reestablished, the frame synchronizer 24a now generates a correct timing pulse and supplies it to FEC decoder 23a and FEC encoder 25a to allow them to realign their word timing with the data stream to resume their error correcting functions in a short period of time. In the receiving terminal station C, a similar action takes place in the FEC decoder 113a to the action taken by FEC decoder 23a to reestabish word-sync alignment in a much shorter period of time than would otherwise be required.

As soon as the word synchronization is reestablished in the FEC decoder 113a, frame synchronization can be instantly reestablished by the frame synchronizer 114a, which communicates this fact to the controller 120. Controller 120 then sends a control signal to switching circuit 119a to allow it to reestablish bit synchronism with the data stream. When this occurs, switching circuit 119a signals the controller 120 to cause switching circuit 119b to disconnect the output of frame synchronizer 114b from the input of the receive DPU 115b.

The foregoing description shows only one preferred embodiment of the present invention. Various modifications are apparent to those skilled in the art without departing from the scope of the present invention which is only limited by the appended claims. For example, in the repeater station, the frame synchronizer 24 and FEC decoder 23 could equally be as well transposed in their positions so that FEC decoder 23 receives the output of frame synchronizer 24 and applies its output to FEC encoder 25.

What is claimed is:

1. A digital radio transmission system comprising:
    transmit digital processing means for compressing the time scale of a prescribed number of consecutive data bits and leaving a time interval of a predetermined number of bits, generating an additional bit for a channel supervision and inserting it into a first time slot of said time interval immediately following said time-compressed data bits, and generating a timing signal indicative of the position of a second time slot in said time interval following said first time slot to thereby form composite bits;
    error correcting encoder means for performing computations on said composite bits according to an error encoding theorem and inserting an error correcting code derived from the computations into said second time slot in response to said timing signal, thereby forming a block code with said composite bits and said error correcting code;
    error correcting decoder means for performing computations on the block code according to an error decoding theorem for correcting error in said composite bits; and
    receive digital processing means responsive to the output of said error correcting decoder means for separating the additional bit and the time-compressed data bits of said error-corrected composite bits from each other and expanding the time scale of the separated time-compressed data bits.

2. A digital radio transmission system comprising:
    transmit digital processing means including time compression means for compressing the time scale of a prescribed number of consecutive data bits for leaving a time interval of a predetermined length between adjacent time-compressed data bits and means for generating a control bit and a framing bit and inserting them into a portion of said time interval to form composite bits;
    regular-channel error correcting encoder means for performing computations on the composite bits according to an error encoding theorem and inserting an error correcting code derived from the computations into the remainder of said time interval, thereby forming a first block code with said composite bits and said error correcting code and transmitting said first block code over a regular transmission channel;
    standby-channel error correcting encoder means for performing computations on the composite bits according to said error encoding theorem and inserting an error correcting code derived from the computations into the remainder of said time interval, thereby forming a second block code with the last-mentioned composite bits and the last-mentioned error correcting code and transmitting said second block code over a standby transmission channel;
    first channel-switching means for normally connecting said transmit digital processing means to the input of said regular-channel error correcting encoder means and switching said transmit digital processing means to the input of said standby-channel error correcting encoder means in the event of a fault in said regular transmission channel;
    regular-channel frame synchronizer means for detecting said framing bit in the transmitted first block code to establish frame synchronization and generating a first timing signal in response to the detection of the framing bit;
    regular-channel error correcting decoder means for performing computations on the transmitted first block code in response to said first timing signal according to an error decoding theorem for correcting error in the composite bits of said first block code;
    standby-channel frame synchronizer means for detecting the framing bit in the transmitted second block code to establish frame synchronization and generating a second timing signal in response to the detection of the last-mentioned framing bit;
    standby-channel error correcting decoder means for performing computations on the transmitted second block code in response to said second timing signal according to said error decoding theorem for correcting error in the composite bits of said second block code;
    receive digital processing means for detecting the control bit and the time-compressed data bits from the error corrected composite bits of one of said first and second block codes and expanding the time scale of the detected time-compressed data bits; and
    second channel-switching means for normally connecting said receive digital processing means to the output of said regular-channel error correcting decoder means and switching said receive digital processing means to the output of said standby-channel error correcting decoder means in the event of said fault.

3. A digital radio transmission system comprising:
    transmit digital processing means for compressing the time scale of a prescribed number of consecutive data bits and leaving a time interval of a predetermined length between adjacent time-compressed data bits, generating a channel monitoring bit and a framing bit and inserting them into a first time slot of said time interval and generating a first timing signal indicative of the position of a second time slot within said time interval, thereby forming composite bits;
    regular-channel error correcting encoder means for performing computations on the composite bits according to an error encoding theorem and inserting an error correcting code derived from the computations into said second time slot in response to said first timing signal, thereby forming a first block code with said composite bits and said error correcting code and transmitting said first block code over a regular transmission channel;
    standby-channel error correcting encoder means for performing computations on the composite bits according to said error encoding theorem and inserting an error correcting code derived from the computations into said second time slot in response to said first timing signal, thereby forming a second block code with the last-mentioned composite bits and the last-mentioned error correcting code and transmitting said second block code over a standby transmission channel;

first channel-switching means for normally connecting said transmit digital processing means to the input of said regular-channel error correcting encoder means and switching said transmit digital processing means to the input of said standby-channel error correcting encoder means in the event of a fault in said regular transmission channel;

regular-channel frame synchronizer means for detecting said framing bit in the transmitted first block code to establish frame synchronization and generating a second timing signal in response to the detection of the framing bit;

regular-channel error correcting decoder means for performing computations on the transmitted first block code immediately following said second timing signal according to an error decoding theorem for correcting error in the composite bits of said first block code;

standby-channel frame synchronizer means for detecting the framing bit in the transmitted second block code to establish frame synchronization and generating a third timing signal in response to the detection of the last-mentioned framing bit;

standby-channel error correcting decoder means for performing computations on the transmitted second block code immediately following said third timing signal according to said error decoding theorem for correcting error in the composite bits of said second block code;

receive digital processing means for detecting the channel monitoring bit and the time-compressed data bits from the error corrected composite bits of one of said first and second block codes and expanding the time scale of the detected time-compressed data bits; and second channel-switching means for normally connecting said receive digital processing means to the output of said regular-channel error correcting decoder means and switching said receive digital processing means to the output of said standby-channel error correcting decoder means in the event of said fault.

4. A digital radio transmission system as claimed in claim 3, further comprising a repeater station which comprises:

second regular-channel frame synchronizer means for detecting said framing bit in the transmitted first block code to establish frame synchronization and generating a replica of said second timing signal in response to the detection of the framing bit;

second standby-channel frame synchronizer means for detecting the framing bit in the transmitted second block code to establish frame synchronization and generating a replica of said third timing signal in response to the detection of the last-mentioned framing bit;

second regular-channel error correcting decoder means for performing computations on the frame-synchronized first block code immediately following said replica of said second timing signal according to said error decoding theorem for correcting error in said first block code;

second standby-channel error correcting decoder means for performing computations on the frame-synchronized second block code immediately following said replica of said third timing signal according to said error decoding theorem for correcting error in said second block code;

second regular-channel error correcting encoder means for performing computations on the frame-synchronized error-corrected first block code according to said error encoding theorem and inserting an error correcting code derived from the computations into the second time slot of said first block code for transmission over said regular transmission channel; and second standby-channel error correcting encoder means for performing computations on the frame-synchronized error-corrected second block code according to said error encoding theorem and inserting an error correcting code derived from the computations into the second time slot of said second block code for transmission over said standby transmission channel.

* * * * *